Figure 1:
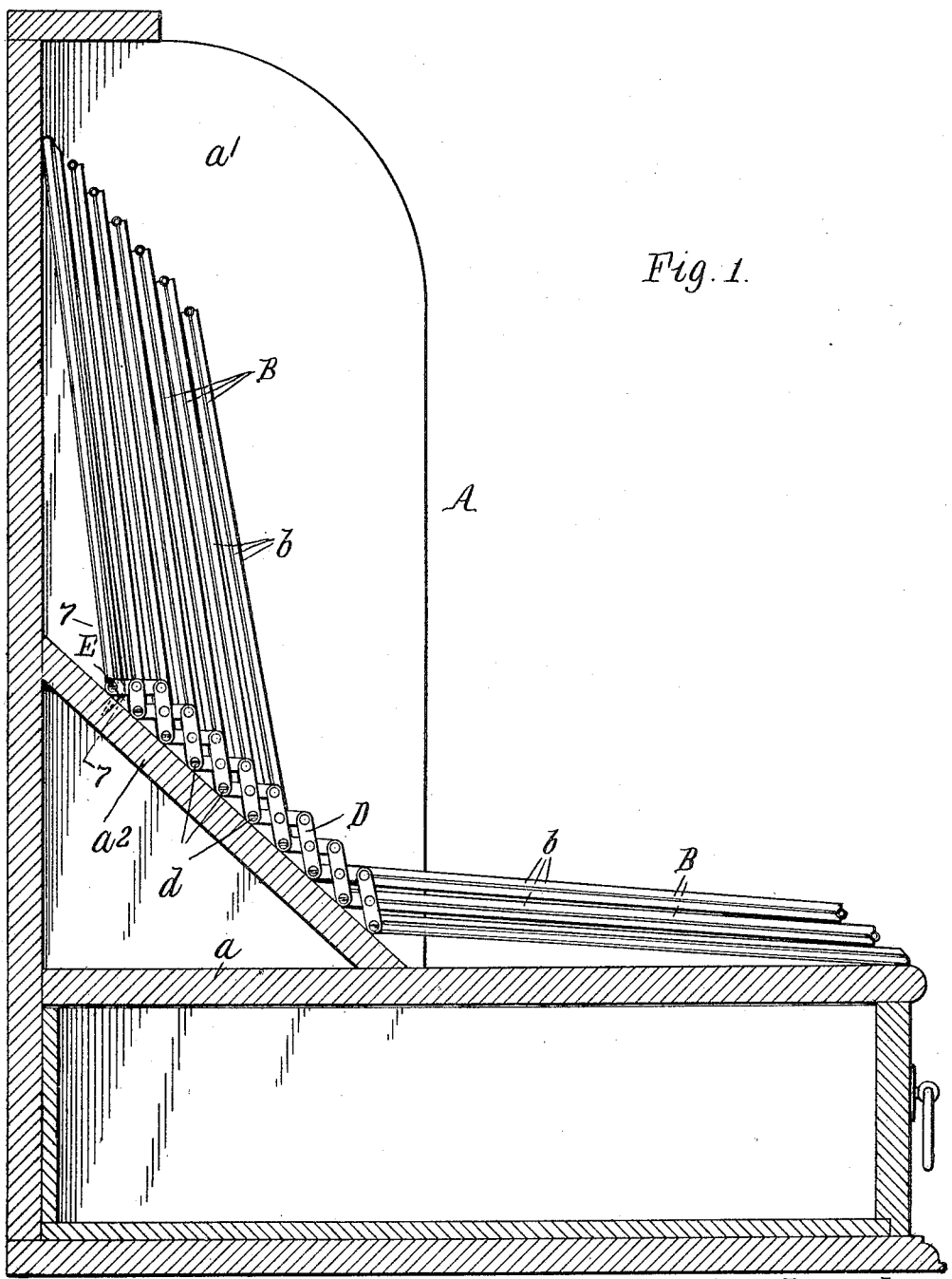

L. E. LEONARD.
ACCOUNT FILE OR REGISTER.
APPLICATION FILED JUNE 1, 1909.
1,107,326.
Patented Aug. 18, 1914.
2 SHEETS—SHEET 2.
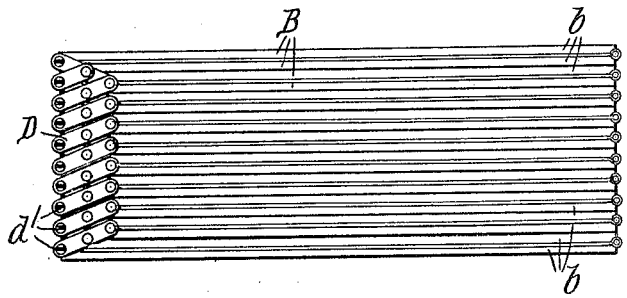
Fig. 2.
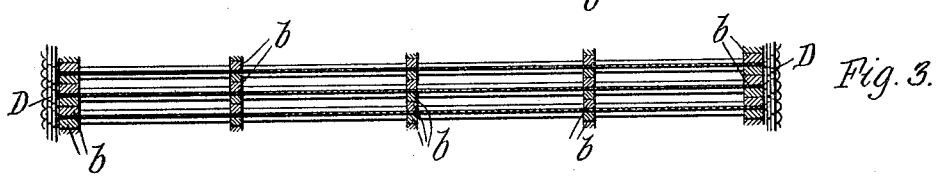
Fig. 3.
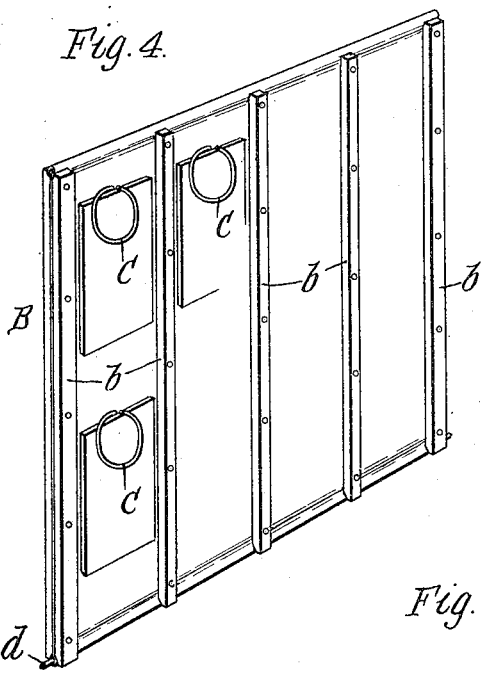
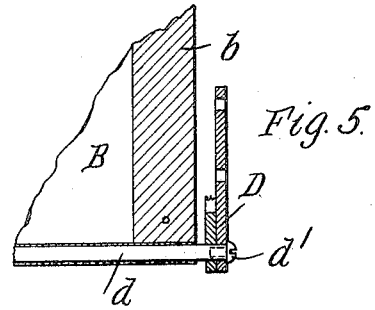
Fig. 5.
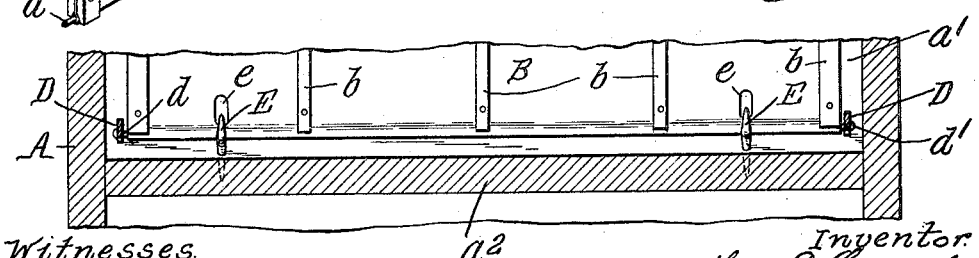
Fig. 7.
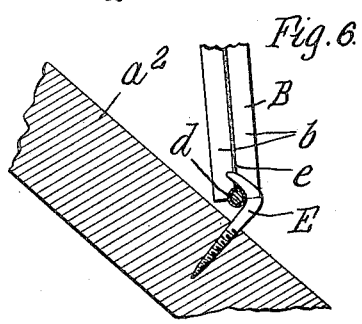
Fig. 6.
Witnesses
A. G. Dimond
E. A. Vock
Inventor
Leon E. Leonard,
By Wilhelm, Parker & Ward,
Attorneys.

UNITED STATES PATENT OFFICE.

LEON E. LEONARD, OF BUFFALO, NEW YORK, ASSIGNOR, BY MESNE ASSIGNMENTS, TO THE SUPERIOR REGISTER COMPANY, OF CANISTEO, NEW YORK, A CORPORATION.

ACCOUNT FILE OR REGISTER.

1,107,326.  Specification of Letters Patent.  Patented Aug. 18, 1914.

Application filed June 1, 1909.  Serial No. 499,409.

*To all whom it may concern:*

Be it known that I, LEON E. LEONARD, a citizen of the United States, residing at Buffalo, in the county of Erie and State of New York, have invented a new and useful Improvement in Account Files or Registers, of which the following is a specification.

This invention relates to improvements in that type of files or account registers, for holding duplicate sales slips, accounts, or other papers, that comprise a series of leaves or plates which are equipped with suitable clips for releasably retaining the papers in place on the leaves, and are hinged together at one edge in the form of a book so that the leaves can be turned over for examining the papers.

The objects of the invention are to provide a desirable hinge connection for the leaves of simple and inexpensive construction, which permits the hinged ends of the leaves to be spread apart when the leaves are placed in the cabinet or holder therefor, so that the leaves can swing freely without contact or interference with each other, and allows the leaves to be collapsed into compact form suitable for being stored in a safe or transported. This is accomplished by connecting the leaves at their back or lower ends by lazy-tongs preferably arranged at the opposite side edges of the leaves. The leaves are pivoted directly to the lazy-tongs, which, by reason of their capability of elongating and collapsing, permit the hinged ends of the leaves to be spread apart or collapsed in contact with each other.

In the accompanying drawings, consisting of two sheets: Figure 1 is a sectional elevation of a file or account register embodying the invention. Fig. 2 is a side elevation of the leaves collapsed and removed from the cabinet. Fig. 3 is a fragmentary transverse section of the leaves. Fig. 4 is a perspective view of one of the leaves detached. Fig. 5 is an enlarged fragmentary sectional elevation, showing one of the leaf hinges. Fig. 6 is an enlarged sectional elevation of the device for retaining the leaves in the cabinet. Fig. 7 is a fragmentary cross-section of the file, in line 7—7, Fig. 1.

Like reference characters refer to like parts in the several figures.

A represents a cabinet or box in which the leaves B are normally held in an upright position for use. The cabinet can be of any suitable construction, that shown having a horizontal base portion $a$ and an upright portion $a'$ open at the top and front in which the leaves stand on an inclined board or support $a^2$. The leaves can be of any usual or suitable construction, but they preferably consist of thin metal sheets with beaded upper and lower edges and having narrow parallel wooden strips $b$ secured on the inner faces of the outer or cover leaves and on the opposite faces of the intermediate leaves. The sales slips or other papers are held on the leaves in the spaces between the strips by clamps or clips C of suitable sort attached to the leaves. The strips $b$ hold adjacent leaves apart and prevent the slips or papers on the leaves from contacting with or rubbing against each other.

The leaves B are connected or hinged together at their lower or back ends by lazy-tongs D composed of diagonal levers or bars pivoted together centrally and at their ends as in the usual construction of lazy-tongs. The lazy-tongs are arranged on edge at the opposite side edges of the leaves so that the lazy-tong bars move in vertical planes parallel with the plane of the swinging movement of the leaves toward and from each other, and each leaf is pivoted to the lazy-tongs by pivots which form the pivotal connections for the lower ends of the lazy-tong bars. In the construction shown, each leaf has a wire or rod $d$ which forms the core of the bead at the lower or back edge of the leaf, and the projecting ends of these rods form the connecting pivots for the lower ends of the lazy-tong bars, being secured in the pivot holes of the bars by screws $d'$, see Fig. 5. The leaves can be hinged or pivoted to the lazy-tongs in any other suitable way, but the leaves should be pivoted directly to and connected directly by the lazy-tongs, and preferably the pivots for the leaves constitute one set of pivots for the lazy-tong bars, thus avoiding the cost of separate hinges or connections in addition to the lazy-tongs. This construction permits the hinged ends of the leaves to be spread apart, as far as necessary for the leaves to swing freely when placed in the cabinet A, as shown in Fig. 1, and allows the leaves to be collapsed or closed together directly in contact with each other, as shown in Fig. 2. The leaves can be held in position on the inclined board or support $a^2$ of the cabinet by hooks E which project from the support and engage in holes $e$ in the rear leaf, as shown in Figs. 1, 6 and 7, or by other suitable means. When the leaves are spread and placed in position in the cabinet, with the rear leaf engaged with the hooks E, they can be turned forwardly freely from the upright position to the substantially horizontal position shown in Fig. 1, so as to permit the sales slips or other papers, which may be secured on both faces of the leaves, to be readily examined.

I claim as my invention:

1. The combination of a series of swinging file leaves provided with means for retaining papers thereon, lazy-tongs arranged at the opposite side edges of the leaves, and pivots which connect the leaves to the lazy-tongs and form the hinges for the swinging leaves and one set of connecting pivots for the lazy-tong bars, substantially as set forth.

2. The combination of a series of file leaves provided with means for retaining papers thereon, and lazy-tongs arranged at the opposite side edges of the leaves, said leaves having rods at one end thereof which project beyond the side edges of the leaves and form pivots for connecting the leaves to the lazy-tongs and for connecting the lazy-tong bars to each other, substantially as set forth.

Witness my hand, this 21st day of May, 1909.

LEON E. LEONARD.

Witnesses:
C. W. PARKER,
E. C. HURD.

---

Copies of this patent may be obtained for five cents each, by addressing the "Commissioner of Patents, Washington, D. C."